United States Patent
Ajbani et al.

(10) Patent No.: US 7,326,748 B2
(45) Date of Patent: *Feb. 5, 2008

(54) THERMOPLASTIC COMPOSITION

(75) Inventors: Manoj Ajbani, Copley, OH (US);
Christopher Kiehl, Akron, OH (US);
Thierry Florent Edme Materne, Lasne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 518 days.

This patent is subject to a terminal disclaimer.

(21) Appl. No.: 10/867,235

(22) Filed: Jun. 14, 2004

(65) Prior Publication Data

US 2005/0277736 A1     Dec. 15, 2005

(51) Int. Cl.
*C08L 71/12*    (2006.01)
*C08L 9/06*     (2006.01)

(52) U.S. Cl. .................. 524/425; 524/445; 524/447; 524/451; 524/456; 524/492; 524/508; 524/511; 524/525; 525/132; 525/232; 525/241

(58) Field of Classification Search ............. 525/132, 525/232, 241; 524/508, 511, 525, 445, 447, 524/451, 456, 425, 492

See application file for complete search history.

(56) References Cited

U.S. PATENT DOCUMENTS

| | | | |
|---|---|---|---|
| 3,758,643 A | 9/1973 | Fisher | 260/897 |
| 4,104,210 A | 8/1978 | Coran et al. | 525/232 |
| 4,130,535 A | 12/1978 | Coran et al. | 524/487 |
| 4,183,876 A | 1/1980 | Coran et al. | 525/232 |
| 4,183,877 A * | 1/1980 | Ibaragi et al. | 525/70 |
| 4,202,801 A | 5/1980 | Petersen | 525/232 |
| 4,203,884 A | 5/1980 | Coran et al. | 524/518 |
| 4,250,273 A | 2/1981 | Bohm et al. | 525/99 |
| 4,271,049 A | 6/1981 | Coran | 525/191 |
| 4,311,628 A | 1/1982 | Abdou-Sabet et al. | 525/232 |
| 4,340,684 A | 7/1982 | Bohm et al. | 525/194 |
| 4,343,918 A | 8/1982 | Bohm et al. | 525/194 |
| 4,444,236 A | 4/1984 | Kan et al. | 152/209.5 |
| 4,553,578 A | 11/1985 | Vitus et al. | 152/209.1 |
| 4,594,390 A | 6/1986 | Abdou-Sabet et al. | 525/232 |
| 4,803,244 A | 2/1989 | Umpleby | 525/105 |
| 4,927,882 A | 5/1990 | Bayan | 525/99 |
| 5,021,500 A | 6/1991 | Puydak et al. | 524/525 |
| 5,051,478 A | 9/1991 | Puydak et al. | 525/195 |
| 5,064,910 A | 11/1991 | Hattori et al. | 525/359.1 |
| 5,248,729 A | 9/1993 | Inoue et al. | 525/92 B |
| 5,362,794 A | 11/1994 | Inui et al. | 524/496 |
| 5,523,356 A | 6/1996 | Aldrovandi et al. | 525/237 |
| 5,621,045 A | 4/1997 | Patel et al. | 525/237 |
| 5,672,660 A | 9/1997 | Medsker et al. | 525/101 |
| 5,677,399 A | 10/1997 | Hall | 526/83 |
| 5,786,441 A | 7/1998 | Lawson | 528/229 |
| 5,936,028 A | 8/1999 | Medsker et al. | 524/506 |
| 5,962,573 A | 10/1999 | Berta | 524/105 |
| 6,008,295 A | 12/1999 | Takeichi et al. | 525/105 |
| 6,051,681 A | 4/2000 | Dozeman et al. | 528/485 |
| 6,084,031 A | 7/2000 | Medsker et al. | 525/192 |
| 6,090,880 A | 7/2000 | Zimmer et al. | 524/492 |
| 6,147,160 A | 11/2000 | Wang et al. | 525/106 |
| 6,150,464 A | 11/2000 | Medsker et al. | 525/101 |
| 6,166,132 A | 12/2000 | Berta | 525/64 |
| 6,169,145 B1 | 1/2001 | Medsker et al. | |
| 6,207,761 B1 | 3/2001 | Smith et al. | 525/221 |
| 6,228,908 B1 | 5/2001 | Takeichi et al. | 524/27 |
| 6,251,998 B1 | 6/2001 | Medsker et al. | 525/192 |
| 6,252,007 B1 | 6/2001 | Oziomek et al. | 525/332.6 |
| 7,150,919 B2 * | 12/2006 | Ajbani et al. | 428/492 |
| 2002/0035176 A1 * | 3/2002 | King et al. | 524/140 |

* cited by examiner

*Primary Examiner*—Ana Woodward
(74) *Attorney, Agent, or Firm*—Alvin T. Rockhill

(57) ABSTRACT

The subject invention discloses a thermoplastic composition which is comprised of a blend of a thermoplastic resin and an elastomer, wherein said thermoplastic resin is selected from the group consisting of polyphenylene ether and polystyrene, wherein said elastomer is comprised of a conjugated diene selected from 1,3-butadiene and isoprene, wherein said elastomer is highly branched, wherein said elastomer is characterized by having a G' and G" frequency crossover of no more than 4 radians/s at 100° C., wherein the thermoplastic resin is present in an amount which is within the range of about 5 parts by weight to about 95 parts by weight, and wherein the elastomer is present in an amount which is within the range of about 5 parts by weight to about 95 parts by weight, based upon the total weight of the thermoplastic composition.

37 Claims, No Drawings

THERMOPLASTIC COMPOSITION

BACKGROUND OF THE INVENTION

U.S. Pat. No. 3,758,643 discloses blends of partially cured monoolefin rubber such as EPDM or EPM with a polyolefin resin (polypropylene) where the rubber phase was cured with a peroxide. The compositions were useful as thermoplastic elastomers.

U.S. Pat. No. 4,104,210 discloses compositions of blends of vulcanized high diene rubbers with crystalline thermoplastic polyolefin resins. The diene rubbers include copolymers of diene with styrene, vinyl pyridine, acrylonitrile or methacrylonitrile. The diene rubber content in the blends is about 75-55 parts by weight and the thermoplastic polyolefin content is 25-45 parts by weight and the diene was highly crosslinked. U.S. Pat. No. 4,104,210 does not disclose that useful blend compositions can be obtained when the diene copolymer rubber comprises of multiple arms and is coupled with tin or silicon, it also does not disclose that thermoplastic blend compositions that have improved processability in injection molding and extrusion can be developed with the tin or silicon-coupled diene copolymer rubbers and copolymer rubbers that are highly branched. The subject patent also does not suggest that the diene-based rubbers used in the blends may comprise of copolymers of 1,3-diene polybutadiene and isoprene.

U.S. Pat. No. 4,130,535 discloses blends of polyolefin resins and completely cured monoolefin copolymer rubber such as Ethylene-Propylene-Diene rubber.

U.S. Pat. No. 4,183,876 discloses thermoplastic compositions of crystalline thermoplastic polyolefin resins and cross-linked polyalkenamer rubber.

U.S. Pat. No. 4,202,801 discloses dynamically and partially cured blends of monoolefin copolymer rubbers such as ethylene-propylene copolymer rubbers or ethylene-propylene-diene terpolymer rubbers, polyolefin resin, and conjugated diene rubbers such as cis-1,4 polyisoprene or cis-polybutadiene or polychloroprene.

U.S. Pat. No. 4,203,884 discloses blends of polynorborene, plasticizer, and thermoplastic polyolefin resin.

U.S. Pat. No. 4,250,273 discloses thermoplastic ter-blend compositions comprising of about 10 to 50 parts of a crystalline 1-olefin polymer, about 80 to 15 parts of a random styrene-butadiene rubber copolymer and from about 5 to 55 parts of a highly saturated elastomer. The invention also relates to ter-blends where the rubbers are partially vulcanized. U.S. Pat. No. 4,250,273 does not disclose that useful blend compositions can be obtained when the diene copolymer rubber comprises of multiple arms and is coupled with tin or silicon, it also does not disclose that high impact blend compositions can be developed with the tin or silicon-coupled diene copolymer rubbers. Further, it does not suggest that a binary blend composition of a styrene-butadiene copolymer rubber and a thermoplastic olefin resin can be used to make useful compositions with good surface appearance and physical properties.

U.S. Pat. No. 4,311,628 relates to blends of polypropylene and EPDM where EPDM was cured with phenolic resins for better oil resistance.

U.S. Pat. No. 4,271,049 discloses blends of crystalline polypropylene and cured rubbers including styrene-butadiene rubber up to 25 weight % styrene or alpha-methyl styrene and the rubber is cured with phenolic or urethane or sulfur donor curative. The preferred compositions were from 25-75 parts of polypropylene and about 75-25 parts of rubber. Furthermore, U.S. Pat. No. 4,271,049 does not teach that useful blend compositions can be obtained when SBR rubber comprises of multiple arms and is coupled with tin or silicon, it also does not disclose that high impact blend compositions can be developed with the tin or silicon-coupled diene copolymer rubbers.

U.S. Pat. No. 4,183,876 teaches blends of crosslinked polyalkenamer rubber and crystalline thermoplastic blends.

U.S. Pat. No. 4,340,684 is similar to U.S. Pat. No. 4,250,273 and further teaches partial curing of the rubber and narrows the claims for the melt flow rate of the formed blend. The styrene content in the SBR rubber is up to 40% by weight of the said rubber. U.S. Pat. No. 4,340,684 does not disclose that useful blend compositions can be obtained when the diene copolymer rubber comprises of multiple arms and is coupled with tin or silicon, it also does not disclose that that compositions that have improved processability in injection molding and extrusion can be developed with the tin or silicon-coupled diene copolymer rubbers. Further, it does not suggest that a binary blend composition of a styrene-butadiene copolymer rubber and a thermoplastic olefin resin can be used to make useful compositions with good surface appearance and physical properties.

U.S. Pat. No. 4,343,918 claims processes for making blends primarily disclosed in U.S. Pat. No. 4,250,273.

U.S. Pat. No. 4,594,390 discloses a process for preparation of thermoplastic elastomers of polypropylene and EPDM under conditions of high shear required for dynamic vulcanization of the EPDM.

U.S. Pat. No. 4,927,882 discloses a thermoplastic elastomer produced by dynamic vulcanization of SBR to form a dispersed phase of crosslinked SBR in a co-continuos phase of SEBS and polypropylene. The blends were useful in pharmaceutical, consumer and health industries.

U.S. Pat. No. 5,021,500 teaches TPO compositions prepared with a crystalline thermoplastic resin and a halobutyl rubber.

U.S. Pat. No. 5,051,478 provides a dynamically vulcanized composition comprising of a polyolefin resin, an elastomer, and an ethylene copolymer resin such as a copolymer of ethylene and vinyl acetate or an alkyl acrylate.

U.S. Pat. No. 5,248,729 suggests the process for making thermoplastic composition by heat treating a mixture of a thermoplastic resin with no olefinic unsaturated carbon-carbon bond, an elastomer from the group of SBS, SIS, 1,2-polybutadiene rubber, and EPDM rubber, with a crosslinking agent of dihydroaromatic compound.

U.S. Pat. No. 5,523,356 teaches blends obtained by dynamic vulcanization of polypropylene, polyisobutene, EPDM rubber, and polybutadiene.

U.S. Pat. No. 5,621,045 discloses thermoplastic vulcanizates from semi-crystalline polyolefins and blends of crosslinked rubbers with one rubber being C4 to C7 isomonoolefin based (isobutylene) and rubber being EPDM or rubbers derived from a conjugated diene.

U.S. Pat. No. 6,051,681 discloses process for preparation of thermoplastic elastomer with a rubber such as ethylene-alpha-olefin diene terpolymer (EPDM) and a thermoplastic resin, phenolic curative, a hydrotalcite and a HALS compound.

U.S. Pat. No. 6,207,761 discloses thermoplastic ionomer blend or alloy composition containing an ionomer, crosslinked rubber and polyolefin resins.

U.S. patent application Ser. No. 10/402,614, filed Mar. 28, 2003, discloses a thermoplastic composition which is comprised of a blend of a thermoplastic polyolefin resin and an elastomer, wherein said thermoplastic polyolefin resin is selected at least from the group of polyethylene, isotactic polypropylene, syndiotactic polypropylene, polypropylene impact copolymers containing about 1-7% by weight of ethylene, butene, hexene, or octene, polyolefin copolymers, polybutene, reactor grade modified polypropylene, oxypolyolefin, metallocene polypropylene, wherein said elastomer is comprised of a conjugated diene selected from 1,3-butadiene and isoprene, wherein said elastomer is highly branched, wherein said elastomer is characterized by having a G' and G" frequency crossover of no more than 4 radians/s at 100° C., wherein the thermoplastic polyolefin is present in an amount which is within the range of about 5 parts by weight to about 95 parts by weight, and wherein the elastomer is present in an amount which is within the range of about 5 parts by weight to about 95 parts by weight, based upon the total weight of the thermoplastic composition.

SUMMARY OF THE INVENTION

The subject invention discloses a thermoplastic composition which is comprised of a blend of a thermoplastic resin and an elastomer, wherein said thermoplastic resin is selected from the group consisting of polyphenylene ether and polystyrene wherein said elastomer is comprised of a conjugated diene selected from 1,3-butadiene and isoprene, wherein said elastomer is highly branched, wherein said elastomer is characterized by having a G' and G" frequency crossover of no more than 4 radians/s at 100° C., wherein the thermoplastic resin is present in an amount which is within the range of about 5 parts by weight to about 95 parts by weight, and wherein the elastomer is present in an amount which is within the range of about 5 parts by weight to about 95 parts by weight, based upon the total weight of the thermoplastic composition.

The present invention also discloses a process for preparing a thermoplastic composition which comprises (1) mixing a thermoplastic resin and an elastomer at a temperature about or above the softening point of the thermoplastic resin in a mixing device, (2) discharging the mixed blend from the mixing device, and (3) forming the mixed blend into a pellet, sheet, or article of manufacture, wherein said thermoplastic resin is selected from the group consisting of polyphenylene ether and polystyrene wherein said elastomer is comprised of a conjugated diene selected from 1,3-butadiene and isoprene, wherein said elastomer is highly branched, wherein said elastomer is characterized by having a G' and G" frequency crossover of no more than 4 radians/s at 100° C., wherein the thermoplastic resin is present in an amount which is within the range of about 5 parts by weight to about 95 parts by weight, and wherein the elastomer is present in an amount which is within the range of about 5 parts by weight to about 95 parts by weight, based upon the total weight of the thermoplastic composition.

The thermoplastic compositions of this invention are particularly useful for manufacturing automotive interior panels, automotive exterior body panels, automotive instrument panels, soft-touch parts, household appliances, household goods, toys, razor holders, razor handles, stapler handles, pen grips, computer housings, and computer key boards.

DETAILED DESCRIPTION OF THE INVENTION

In accordance with this invention, elasto-plastic blends of a diene elastomer coupled with silicon or tin with thermoplastic resins are disclosed. Such thermoplastic blends have lower viscosity and a good balance of physical properties. The elastomers have low glass transition temperatures for providing low temperature impact properties. Also disclosed is the preferred process of preparing such blends. These blends may have several useful applications such as automotive exterior, interior, body panels, household articles, appliance parts, toys, etc. Furthermore, the crumb form of the diene rubber with tin or silicon coupling or a higher degree of branching, has high resistance to cold flow and can be fed into continuous mixing equipment such as a twin-screw extruder without being appreciably re-agglomerated.

Thermoplastic materials are widely used in an automobile. The fascia or bumpers or side impact panels form a major portion of the thermoplastic material usage. More recently, resins are also being used in automotive interior applications and are also being used for PVC replacement. These materials are generally comprised of blends of a thermoplastic resin such as polyphenylene ether. Since the glass transition temperature of the polyphenylene ether ranges from about 160° C. to 230° C. and is not low enough, it possesses inferior low temperature impact properties. Therefore, the polyphenylene ether additionally consists of an elastomeric phase that has a lower glass transition temperature ($T_g$) for providing the necessary cold temperature impact properties. The elastomers used are generally olefinic based with either low diene unsaturation or no diene unsaturation. The olefinic elastomers with low diene unsaturation are ter-polymers of ethylene, propylene, and a non-conjugated diene based monomer (EPDM). The olefinic elastomers with no diene unsaturation may be ethylene-propylene copolymers. More recently, these no-diene elastomers have been metallocene-based ethylene elastomers.

The elastomeric phase may be co-continuous with the thermoplastic resin phase if greater level of flexibility is required, without appreciably sacrificing the thermoplasticity. The elastomer phase may be non-crosslinked or partially crosslinked. For the sake of this invention, the thermoplastic materials are considered blends of a thermoplastic resin and an elastomer where the thermoplastic content is high enough and the elastomer may or may not be crosslinked. There is considerable prior art mentioning the use of other compounding ingredients such as talc, UV stabilizers, antioxidants, processing aids, oils, colorants, adhesion promoter's etc. that may also be a part of the thermoplastic composition.

If in such thermoplastic blends the elastomer content is high enough and yet not too high as it is in the vulcanized and thermosetting rubber articles such as tires, the blends tend to render elastomer-like properties without losing the thermoplasticity. In other words, when the thermoplastic blends or their articles are stretched and released, they tend to somewhat return to their original state in a nominal time period and are still re-processable as thermoplastics. Such blends may often be called thermoplastic elastomers or TPEs. If the elastomeric phase in the TPEs is crosslinked or vulcanized, preferably highly crosslinked and mostly during the preparation of the said blends, the TPEs may also called as Thermoplastic Vulcanizates or TPVs. High degree of crosslinking enables greater elasticity and low compression set and generally higher oil resistance compared to their uncrosslinked analogs. For the sake of this invention, the above definitions of TPO, TPE and TPV will be generally applicable to describe the compositions and processes per this invention. In this invention, elastomers and rubbers are used interchangeably. In this invention, vulcanized, crosslinked, and cured terms are also used interchangeably.

The thermoplastic resins that are used in the blends of this invention include polyphenylene ether and polystyrene. The polystyrene can be of any isomeric form including syndiotactic polystyrene. Polyphenylene ether resins that are most useful in this invention include but are not limited to poly(2,6-dimethyl-1,4-phenylene ether), poly (2,6-dimethyl-co-2,3,6-trimethyl-1,4-phenylene ether), poly(2,3,6-trimethyl-1,4-phenylene ether), poly(2,6-diethyl-1,4-phenylene ether), poly(2-methyl-6-propyl-1,4-phenylene ether), poly(2,6-dipropyl-1,4-phenylene ether), poly(2-ethyl-6-propyl-1,4-phenylene ether), poly(2,6-dilauryl-1,4-phenylene ether), poly(2,6-dephenyl-1,4-phenylene ether), poly(2,6-dimethoxy-1,4 phenylene ether), poly(1,6-diethoxy-1,4-phenylene ether), poly(2-methoxy-6-ethoxy-1,4-phenylene ether), poly(2-ethyl-6-stearyloxy-1,4-phenylene ether), poly (2,6-dichloro-1,4-phenylene ether), poly(2-methyl-6-phenyl-1,4-phenylene ether), poly(2-ethoxy-1,4-phenylene ether), poly(2-chloro-1,4-phenylene ether), poly(2,6-dibromo-1,4-phenylene ether), and poly(3-bromo-2,6-dimethyl-1,4-phenylene ether), their respective homopolymers or copolymers. Polyphenylene ether resins (also known in the art as PPE and poly phenylene oxide or PPO) used may be of a wide range of molecular weights. The molecular weights will preferably be less than 100,000 g/mole, more preferably below 70,000 g/mole, and most preferably below 50,000 g/mole. The other measure of molecular weight is the intrinsic viscosity measurement that is a dilute solution viscometry method. For example, a medium molecular weight polyphenylene ether resin may have an intrinsic viscosity value of 0.4 dl/g, when measured in chloroform solvent. Such polyphenylene ether resins are available from The General Electric Company's Specialty Division or Crompton Corporation under the name Blendex® HPP820. Blends of polyphenylene ether and polystyrene in the ratio of 70:30 are also available under the grade name Blendex® HPP830 and may also be used in this invention.

The polystyrene that can be used in the practice of this invention is an inexpensive and hard plastic. Polystyrene is used in a wide variety of applications including housings for computers, monitors, television sets and is best known in its blown form as a packaging and insulating material. Clear plastic drinking cups are made of polystyrene as are certain molded parts on the inside of automobiles, trucks, airplanes and other vehicles, such as the radio knobs.

Polystyrene is a vinyl polymer. Structurally, it is a long hydrocarbon chain, with a phenyl group attached to every other carbon atom. Polystyrene is produced by free radical vinyl polymerization, from the monomer styrene.

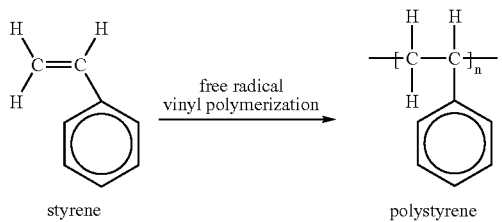

Syndiotactic polystyrene can also be utilized in making the blends of this invention. Syndiotactic polystyrene is different because the phenyl groups on the polymer chain are attached to alternating sides of the polymer backbone chain. "Normal" or atactic polystyrene has no order with regard to the side of the chain on which the phenyl groups are attached.

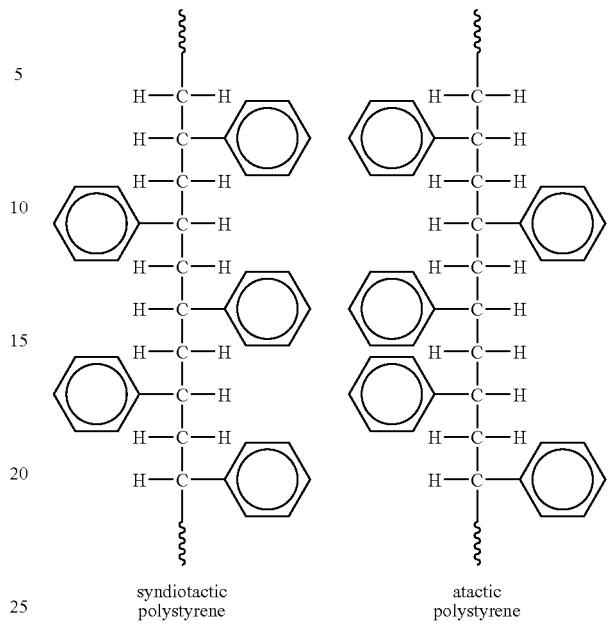

The thermoplastic resin will preferably have a melt flow rate that is greater than 0.5 g/10 minutes as measured by ASTM D1238 at 260° C./2.16 kg load.

The diene elastomers that are generally prepared by solution polymerization techniques were described in Paper No 158, at the Rubber Division Meeting of the American Chemical Society, Orlando, Fla., Sep. 21-24, 1999. The solution rubbers that are particularly useful in this invention are elastomers such as copolymers of styrene and a diene selected from butadiene and isoprene wherein the living polymer is modified with tin or silicon, before terminating the polymerization. Such elastomers may also be, for example, styrene/butadiene copolymers and styrene/isoprene/butadiene ter-polymers. Homopolymers of a diene may also be employed, but it is more preferred to have styrene present as a co-monomer. Copolymers of isoprene and butadiene may also be used.

An important characteristic of the elastomer, particularly tin-modified elastomers, is that a substantial portion, preferably at least 40%, and more generally in the range of about 60 to about 85% of the tin (Sn) bonds or silicon (Si) bonds are bonded to the diene units of the styrene/diene copolymer, which may be referred herein as tin-dienyl or silicon-dienyl bond, for example butadienyl bonds in case of butadiene terminating with the tin (or silicon).

A modified copolymer elastomer may be prepared by copolymerization of styrene with 1,3-butadiene and/or isoprene in an organic solution with an alkyl lithium catalyst. A co-catalyst or catalyst modifier may also be used. Such polymerization methods are well known to those skilled in this art. After formation of the copolymer elastomer, but while the catalyst is still active and, therefore, while the copolymer is still considered a living or live polymer that is capable of further polymerization, the polymerization can be terminated by reacting the live polymer with a tin or silicon compound such as tin tetrachloride. This taking into account that the valence of tin is four, typically the modified copolymer is considered coupled or capped, with an accompanying molecular weight or viscosity jump or increase, and the modified copolymer being in what is sometimes called as a star shaped, or star configured, coupled elastomer. Synthetic elastomers that are made by emulsion polymerization techniques are not amenable to such coupling techniques and are not intended to be employed in the blends of this invention. A coupled styrene/isoprene/butadiene terpolymer may also be used where the isoprene content is less than about 30% by weight or so of the said elastomer.

A tin coupled copolymer elastomer can also be obtained via coupling with an organo tin compound such as for example alkyl tin chloride, dialkyl tin chloride, and trialkyl tin chloride, resulting in variations in the tin coupled polymer with the trialkyl tin monochloride yielding simply a tin terminated copolymer.

Some examples of preparation of such elastomers are further given in the following Journal Articles: "Solution-Polymerized Rubbers with Superior Breakdown Properties" Journal of Applied Polymer Science Vol. 14, PP 1421-1432 (1970), "Tin Coupled SBRs: Relationship between Coupling Type and Properties, Paper No 78, Presented at 148$^{th}$ Meeting of the Rubber Division, American Chemical Society, Cleveland, Ohio, Oct. 17-20, 1995, and "Newly Developed Solution SBRs for Low Rolling Resistance Tire", RCT 1990 V 63 # 1, P 8-22, which are incorporated herein as a reference.

Some examples of modified or coupled solution elastomers such as tin or silicon-coupled, with several variations are given in U.S. Pat. No. 6,090,880, U.S. Pat. No. 5,064,910, U.S. Pat. No. 4,553,578, U.S. Pat. No. 4,444,236, U.S. Pat. No. 5,362,794, U.S. Pat. No. 5,677,399, U.S. Pat. No. 5,786,441, U.S. Pat. No. 6,008,295, U.S. Pat. No. 6,252,007, and U.S. Pat. No. 6,228,908, which are incorporated herein by reference, as they may also be used in blends as disclosed in this invention.

The diene elastomers that are polymerized by solution techniques that may or may not be coupled with silicon or tin have several advantages due to the ability to tailor the elastomers with specific glass transition temperatures, styrene content, percent butadiene microstructure (1,2-butadiene or vinyl), and/or changing the level of branching. It is generally preferred to have the modified diene elastomer to have styrene content in the range of 5 to 45%, more generally in the 10 to 40% range, and most preferably in the 12 to 37% by weight of the said elastomer. It is known that the glass transition temperature of the said rubber may increase on increasing the styrene content. For applications that require low temperature impact properties such as automotive fascia or side impact panels, it is generally preferred to use the elastomer that has a glass transition temperature no greater than −25° C., more preferred no more greater −40° C., most preferred no greater than −45° C.

U.S. Pat. No. 4,250,273 describes several diene monomers that may be used to make solution polymers, which may be suitable to make the coupled elastomers used in this invention, and is incorporated herein by reference.

The diene based rubbers that are additionally useful for making the blend compositions are highly branched and may or may not be obtained via tin or silicon coupling. These diene elastomers are characterized in a dynamic mechanical thermal analyzer such as a RPA instrument (Rubber Process Analyzer) by conducting a frequency sweep at an isothermal temperature of 100° C. The dynamic storage (G') and loss modulii (G") and their ratio (G"/G') or tangent delta are measured. The frequency in (radians/s) at which there is a crossover in the values of G' or G" is measured i.e. the frequency at which the G' and G" values are equal, is measured. The frequency at which there is a crossover in the values of G' and G" is much lower for the highly branched diene elastomers than their rather unbranched or more linear analogs. The synthesis and RPA characterization of such uncoupled elastomers is described in details in the publication "Synthesis and Rheological Characterization of Branched versus Linear Solution Styrene-butadiene Rubber," by Michael L. Kerns, and Steven K. Henning, Paper No 52, Presented at the meeting of the Rubber Division, American Chemical Society, Rhode Island, Apr. 24-27, 2001, which is incorporated herein by reference. The branched elastomers are believed to provide improved cold flow resistance, more particularly for the crumb rubber form, and may also provide improved processing in extrusion applications by remaining largely branched in the blend composition, more so in the TPE and TPV applications.

For the applications where the low temperature impact is not that critical, it may be acceptable to use the elastomer with a slightly higher glass transition temperature. These applications may be where the soft touch or soft feel is desired from the said blend, which can be achieved by using an elastomer with the glass transition temperature that is generally less than 5° C., more generally less than 0° C., and most generally less than −11° C. The elastomer may have the 1,2-butadiene microstructure or the vinyl content varied from about 5% to about 95%, more generally from about 6% to about 65%, and most generally from about 6% to about 58%. This flexibility in variation of the vinyl content is possible with the solution elastomers. The glass transition of the elastomer may also increase with increasing vinyl content. Therefore, applications requiring better low temperature impact properties, a lower vinyl content is desirable. For applications where soft touch and soft feel is desired, higher vinyl content may be preferred. Also, the resistance to ultraviolet (UV) radiation, ozone, and oxidation resistance may also be a function of the vinyl content, which may be achieved by a proper selection of the vinyl content.

For the use of the blend in injection molding applications, a diene based elastomer with a lower viscosity is preferred. It is critical for the starting branched elastomer to be characterized by a low crossover frequency for improved cold-flow resistance and wherein the branching is achieved in the elastomer by tin-coupling, it is desired for the branched or star shaped architecture present in the said elastomer to break in the process of making or molding the blend. Certain compounding agents that facilitate the breaking of the tin-carbon bond in the elastomer may be employed, such as stearic acid, benzoic acid or rosin acid. At very high shear rates, such compounding agents may not be required.

The Mooney viscosity (ML 1+4@100° C.) of the said solution rubber may be generally in the range of 10 to about 135, more preferably from 25 to about 100, and most preferably from about 30 to about 80 or so. For making the TPO compositions, the polyolefin and the said rubber are mixed or kneaded around or above the softening point temperatures of the polyphenylene ether or polystyrene (this temperature may be 50° C. to 120° C. above the glass transition temperature or the melting point of the resin). Typical polymer mixing or kneading equipment that is capable of rendering heat and kneading may be employed. These include mills, kneaders, extruders (both single screw and twin-screw), Banbury mixers, calenders, and the like. The sequence of mixing and method may depend on the final composition. A combination of Banbury batch mixers and continuous mixers may also be employed, such as a Banbury mixer followed by a mill mixer followed by an extruder. The extruder can be a single or twin screw extruder. If a TPE or TPV composition is being obtained, typical batch mixers such as Banbury mixers may be employed to mix the rubber and the thermoplastic till a homogeneous mixture is obtained. For such TPE or TPV compositions, a continuous mixer such as a twin-screw extruder may also be used. Such TPE & TPV compositions may have a higher rubber loading when compared to the TPO compositions. Generally speaking, for the TPE and TPV compositions, the weight ratio of the said rubber to the thermoplastic may be from about 90:10 to about 50:50, more preferably from about 80:20 to about 60:40, and most preferably from about 75:25 to about 65:35 or so. For the TPO applications, the weight ratio of the said rubber to the thermoplastic may be from about 49:51 to about 10:90, more preferably from 35:65 to about 15:85. The ratios may be changed by changing the viscosity ratios of the rubber and the thermoplastic. There is considerable art in the literature for changing the phase continuity by changing the viscosity ratios of the constituents and a person skilled in this art may vary the phase continuity by changing the viscosity ratios of the elastomer and the thermoplastic resin.

The blend compositions may contain processing oils, plasticizers, processing aids. Rubber processing oils have a certain ASTM designations and may fall under paraffinic, napthenic or aromatic process oils and suitable oils may be employed. The ordinarily skilled rubber chemist will decide on the type of oil that may be used. The parts of oil used may be generally from about 0 to about 130 parts, more preferably about 0 parts to about 100 parts, and most preferably about 0 parts to about 50 parts, per 100 parts of the rubber or elastomer. Higher amounts of oil may tend to improve the processing at the expense of some physical properties.

It is known that the high diene based rubbers have lower resistance to UV, ozone, and oxidation, compared to the low-diene or rubbers with no olefinic unsaturation. It is also known that tires, which are primarily made from the high diene rubbers and often, contain carbon black along with anti-ozone and antioxidants, have a high degree of reliability and durability in dynamic conditions of UV, ozone, and oxygen. Due to the unsaturation present in the elastomer, it is desired to have a layer (coated, coextruded or laminated) of weather resistant film adhered to the blend formed with the diene elastomer and thermoplastic resin.

For the TPO, TPV, and TPE applications, it is preferred that when the application accepts a black color, the rubber phase may preferably contain the carbon black for the UV absorption characteristics. Representative examples of carbon blacks include ASTM N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm3/100 g. It is more preferred that the particle size of the carbon black is small.

The thermoplastic blends may also contain antiozonants and oxidants that are known to a rubber chemist of ordinary skill. The antiozonants may be physical protectants such as waxy materials that come to the surface and protect the part from oxygen or ozone or they may chemical protectors. The chemical protectors may be selected from the class of styrenated phenols, butylated octylated phenol, butylated di(dimethylbenzyl) phenol, p-phenylenediamines, butylated reaction products of p-cresol and Dicyclopentadiene (DCPD, polyphenolic anitioxidants, hydroquinone derivatives, quinoline, diphenylene antioxidants and thioester antioxidants and the like and their blends. Some representative trade names of such products are Wingstay® S antioxidant, Polystay® 100 antioxidant, Polystay® 100 AZ antioxidant, Polystay® 200 antioxidant, Wingstay® L antioxidant, Wingstay® LHLS antioxidant, Wingstay® K antioxidant, Wingstay® 29 antioxidant, Wingstay® SN-1 antioxidant, and Irganox® antioxidants. In some applications, the antioxidants and antiozonants used will preferably be non-staining and non-migratory.

For applications that require non-black pigmentation or compositions where the natural color may be desired, carbon black may not be used and above-mentioned antioxidants and antiozonant may be used instead. It is important that the said elastomer contains a significant portion of the antioxidant and antiozonant and/or carbon black (whenever used) in the said blends.

For providing additional stability against UV radiation, hindered amine light stabilizers (HALS) and UV absorbers such as benzotriazoles and benzophenones may also be used. A skilled person is aware of such stabilizers. For example, Tinuvintm™ R 123, 144, 622, 765, 770 and 780, and Chemisorb™ T-944 and the like may be employed. These kinds of UV stabilizers are available from Ciba Specialty Chemicals and Cytex Industries. U.S. Pat. No. 6,051,681 teaches the use of a HALS compound and a Lewis acid for achieving superior surface quality, which is incorporated herein as a reference.

For some compositions, additional mixing process may be employed to pre-disperse these anti-oxidants, antiozonants, carbon black, and UV absorbers and light stabilizers in the said elastomer in a masterbatch form and then add them in the elastomer and plastic blending stage.

When the rubber phase is fully or partially cured in the TPO, and TPV compositions, curatives of the known art may be employed. The curing may be accomplished by dynamic vulcanization, wherein the rubber phase is generally crosslinked simultaneously as it is being mixed with the thermoplastic resin. The curatives may be selected from sulfur based, peroxide based, or phenolic-based curatives. U.S. Pat. No. 3,758,643, U.S. Pat. No. 3,806,558, U.S. Pat. No. 5,051,478, U.S. Pat. No. 4,104,210, U.S. Pat. No. 4,130,535, U.S. Pat. No. 4,202,801, U.S. Pat. No. 4,271,049, U.S. Pat. No. 4,340,684, U.S. Pat. No. 4,250,273, U.S. Pat. No. 4,927,882, U.S. Pat. No. 4,311,628 and U.S. Pat. No. 5,248,729 teach the type of curing or crosslinking agents and methods which are incorporated herein by reference.

The diene containing elastomers may be dynamically vulcanized with hydrosilation curing systems in the presence of the thermoplastic resins. U.S. Pat. No. 6,251,998, U.S. Pat. No. 6,169,145, U.S. Pat. No. 6,150,464, U.S. Pat. No. 6,147,160, U.S. Pat. No. 6,084,031, U.S. Pat. No. 5,672,660, U.S. Pat. No. 5,936,028, and U.S. Pat. No. 4,803,244 teach the methods and hydrosilation crosslinking systems that are useful and can be used in this invention, the teachings of which are incorporated herein as a reference.

When sulfur based curing agents are employed, accelerators and cure activators may be used. Accelerators are used to control the time and/or temperature required for dynamic vulcanization and to improve the properties of the TPO or TPV. In one embodiment, a single accelerator system may be used, i.e., primary accelerator. The primary accelerator(s) may be used in total amounts ranging from about 0.5 to about 4, preferably about 0.8 to about 1.5, phr, where phr means per hundred parts of rubber. In another embodiment, combinations of a primary and a secondary accelerator might be used with the secondary accelerator being used in smaller amounts, such as from about 0.05 to about 3 phr, in order to activate and to improve the properties of the TPO or TPV. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. Certain processing aids and cure activators such as stearic acid and ZnO may also be used. When peroxide based curing agents are used, co-activators or coagents that are known to a rubber chemist of ordinary skill may be used in combination with the peroxides. These coagents may include trimethylolpropane triacrylate (TMPTA), trimethylolpropane trimethacrylate (TMPTMA), triallyl cyanurate (TAC), Triallyl Isocyanurate (TAIC), and the like. The peroxide crosslinkers and the coagents that may be employed for partial or complete dynamic vulcanization can be selected from the journal publication, "Peroxide Vulcanization of Elastomer," Vol. 74, No 3, July-August 2001, which is incorporated here by reference.

When the elastomer is at least partially crosslinked, especially in the TPVs, the degree of crosslinking may be measured by dissolution of the blend in a solvent for specified duration, and using certain calculations to compensate for the resin portion and then calculate % gel or unextractable rubber. The % gel would normally increase with increasing crosslinking level. These techniques are well defined and established and are known to the persons that are skilled in this art. The % gel content in the thermoplastic blends, more so in the TPVs may be anywhere in the range of about 5% to 100%.

The blends of the coupled-SBR and the thermoplastic resin may show improved processability. The improved processability may be due to the breaking of tin-carbon due to shearing. These bonds may also be broken rapidly by the addition of viscosity reducing agents such as stearic acid, benzoic acid, rosin acid, carbon black amine or acid containing moieties and in the presence of an acceptable amount of shear and heat. Improved processability of the blend composition, more specifically the TPE or TPV compositions that have higher rubber content, may be characterized by a lower viscosity of the blend or an improved surface appearance of the molded or extruded article. The UV stabilization and thermo-oxidative stabilization technology for the thermoplastic resins and their blends for TPOs, TPEs and TPVs are rather well developed. Two recent articles and presentations describe these stabilizations in detail. These are: 'Advances in UV Stabilization Systems for Automotive TPO', Brent M. Sanders, Cytex Industries, Presented at the SPE Automotive TPO Global Conference 2000, Hyatt Regency—Dearborn, Mich., Oct. 2-4, 2000, and 'Stabilizer Selection Guidelines for Automotive TPO Applications', James H. Botkin and Peter Solera, Ciba Speciality Chemicals Corporation, SPE Automotive TPO Global Conference 2001, Hyatt Regency-Dearborn, Mich., Oct. 1-3, 2001, which are incorporated herein by reference. These stabilization systems may be essential for achieving the UV and heat aging requirements that the TPOs have to meet, especially for the automotive applications.

The thermoplastic compositions may also contain reinforcing fillers such as talc, calcium carbonate ($CaCO_3$), glass fibers, expandable 2:1 layered silicates such as Smectite, Hectorite, mica and the like, carbon black, silica, alumina for providing appropriate level of reinforcement, wollastonite and graphite. Silane coupling agents may also be employed for better filler bonding. Talc is more preferred due to its attractive cost and performance. Modified carbon blacks such as CRX 2000 series, CRX 4000 series of Cabot Corporation, modified starch, modified silica (pre-treated, doped) may also be used.

The thermoplastic blends of this invention typically have a melt flow rate of at least 0.5 g/10 minutes as measured by ASTM D1238 at 260° C./2.16 kg load. The thermoplastic compositions of this invention may be processed by conventional molding techniques such as injection molding, extrusion, thermoforming, slush molding, over molding, insert molding, blow molding and the like. It is known to an ordinary person skilled in the art of rheology to select the viscosity of the composition according to the appropriate process. For example, a low melt flow rate blend may be required for extruding application and a high melt flow rate blend may be required for an injection molding application for molding large parts. The particle size of the major portion of the elastomer in the thermoplastic blend will be smaller than 50 microns and more preferably smaller than 10 microns.

The thermoplastic compositions of this invention have several useful applications including automotive parts, household goods, industrial appliances, recreational and computer/electronics equipment. In the automotive area, exterior fascia or bumpers and side impact panels are some common applications. The fascias may be molded in color or painted or may have a weather resistant film coated on the surface. Some representative automotive interior applications include door handles, knobs, instrument panels, roof impact structures, and other applications replacing PVC. The automotive interior applications may also include components of the vehicle that require soft feel or soft touch. Also, impact resistant structural door panels may be made from these thermoplastic blends.

U.S. Pat. No. 5,962,573, U.S. Pat. No. 6,166,132, and U.S. Pat. No. 6,166,139 disclose compositions and methods for making directly paintable TPO applications, and are incorporated herein by reference.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES

Solflex® 3310 Sn (Solflex® 3310 coupled with tin) styrene butadiene rubber prepared by solution polymerization from The Goodyear Tire & Rubber Company was used to make blends with the amorphous thermoplastic resins. For comparison or control purposes, Solflex® 3310 SBR (no coupling) of The Goodyear Tire & Rubber Company was used to make the blends with amorphous thermoplastic resins. Solflex® 3310 Sn SBR and Solflex® 3310 SBR are the styrene-butadiene rubbers (SBRs) prepared by solution polymerization techniques having a bound styrene content of about 33%. Solflex® 3310 Sn SBR is highly branched SBR that is additionally coupled with tin at the termination of the solution polymerization. The microstructures of the SBRs used are listed in Table 1.

TABLE 1

| Rubber | Composition & Microstructure in Weight % | | | |
|---|---|---|---|---|
| | Styrene | 1,2-butadiene | Cis-1,4-butadiene | Trans-1,4-butadiene |
| Solflex ® 3310 Sn SBR | 34.1 | 7.9 | 21.8 | 36.2 |
| Solflex ® 3310 SBR | 32.5 | 7 | 23.9 | 36.6 |

The glass transitions temperatures (midpoint) of Solflex® 3310 Sn SBR and Solflex® 3310 SBR were measured in a differential scanning calorimetry (DSC) at a 110° C. heating rate and were −55° C. and −50° C. respectively. Frequency sweeps were carried out at 100° C. for the Solflex® 3310 Sn SBR and the Solflex® 3310 SBR at 0.63 degree strain in the frequency range of 0.21 radians/s to 209.44 radians/s. The G' and G" values converged and crossed over at a frequency of 5 radians/s for the un-coupled Solflex® 3310 SBR (un-branched and uncoupled SBR). For Solflex® 3310 Sn (branched and tin coupled SBR), the G' and G" values were converging towards the lowest frequency and the crossover point was not measurable in the frequency range employed with the lowest frequency being about 0.21 radians/sec. This indicates that the crossover frequency of Solflex® 3310 Sn SBR was lower than 0.21 radians/sec, that is indicative of a very high level of branching.

The bale form of the SBR rubbers was converted to a crumb or particulate form by grinding the rubber in the presence of talc partitioning agent. Blends of the crumb form of Solflex® 3310 Sn SBR or Solflex® 3310 SBR were made with two amorphous thermoplastic resin systems. The first was a 70:30 polyphenylene ether/polystyrene blend (herein also called polyphenylene oxide/polystyrene or PPO/PS blend) and the second (control) was a high impact acrylonitrile-butadiene-styrene resin copolymer (ABS). The ABS resin contains the rubber butadiene units that are copolymerized with the acrylonitrile and styrene monomer units. The blends of the respective thermoplastic system with the SBRs were made in a 25-mm twin-screw-extruder of Coperion Corporation, with co-rotating and intermeshing screw profile with an effective length to diameter (L/D) ratio of 32. The 8 heated barrels and a heated die section were utilized and all temperature was set to 225° C. The RPM that was used for mixing was set to 300 for the blends with ABS and 200 for the blends with the polyphenylene ether/polystyrene blend. A total feed rate of about 20 lbs./hr was used for the study. Blend compositions that were prepared are given in Table 2. Examples 2, 4, 6, and 8 were prepared by the additionally adding stearic acid to facilitate the breakage of the tin carbon bond during the high shear mixing. The blends were injection molded by injection molding technique by melting the twin-screw extruder prepared blends above the glass transition point of thermoplastic resins. Molded samples were prepared from the injection molded blends and were tested for physical properties with following results as given in Table 3.

TABLE 2

Blend Composition in Weight %

| | Examples | | | | | | | |
|---|---|---|---|---|---|---|---|---|
| | 1 | 2 | 3* | 4* | 5* | 6* | 7* | 8* |
| Solflex ® 3310 Sn | 49.2 | 48.5 | — | — | 64.1 | 62.91 | — | — |
| Solflex ® 3310 | — | — | 49.2 | 48.5 | — | — | 64.1 | 62.91 |
| Talc | 1.52 | 1.5 | 1.52 | 1.5 | 1.99 | 1.95 | 1.99 | 1.95 |
| Blendex ® HPP830[1] | 49.2 | 48.5 | 49.2 | 48.5 | — | — | — | — |
| ABS 433[2] | — | — | — | — | 33.81 | 33.19 | 33.81 | 33.19 |
| Irganox ® 1010[3] | 0.08 | 0.08 | 0.08 | 0.08 | 0.1 | 0.1 | 0.1 | 0.1 |
| Stearic Acid | — | 1.42 | — | 1.42 | — | 1.85 | — | 1.85 |
| Total | 100 | 100 | 100 | 100 | 100 | 100 | 100 | 100 |

*Comparative or control examples
[1] Blendex ® HPP830 is 70:30 polyphenylene ether/polystyrene blend of General Electric Company's Specialty Division and currently supplied by Crompton Corporation.
[2] ABS 433 is a high impact resin (acrylonitrile-butadiene-styrene copolymer) with a Melt flow of 5.0 (230 C/3.8 kg) of the Bayer Corporation.
[3] Irganox ® 1010 is a polyphenol antioxidant of Ciba Specialty Chemicals Corporation.

TABLE 3

Blend Physical Properties & Viscosity

| | Examples | | | | | | | |
|---|---|---|---|---|---|---|---|---|
| | 1 | 2 | 3* | 4* | 5* | 6* | 7* | 8* |
| Apparent Viscosity (200° C.) in (Pa · s) @1500 (1/s) | 643 | 529 | 738 | 660 | 295 | 278 | 281 | 296 |
| Apparent Viscosity (200° C.) in (Pa · s) @1000 (1/s) | 830 | 659 | 979 | 878 | 384 | 363 | 372 | 396 |
| Tensile Stress @ Break (MPa) | 19.5 | 18.7 | 19.1 | 18.2 | 6.2 | 5.9 | 6.1 | 5.8 |
| Elongation @ Break % | 21 | 12 | 19 | 24 | 12 | 12 | 10 | 12 |

*Comparative/control examples

Example 1 is a blend of the branched and tin coupled SBR prepared by blending with PPO/PS blend and is compared with the Example 3 that contains the blend of unbranched SBR and PPO/PS blend. Example 1 had a lower viscosity or better flow when compared with Example 3 that is desirable in injection molding for better surface appearance. Lower viscosity is also desired in extrusion applications for obtaining higher extrusion speeds or throughputs at lower power consumption. Examples 2 and 4 were prepared with the PPO/PS resin and respectively contained the tin-coupled branched SBR (Solflex® 3310 Sn) and the uncoupled SBR (Solflex® 3310). Additionally, stearic acid was added to further reduce the viscosity. Lowest melt viscosity was observed for Example 2 that contained the tin-coupled SBR and stearic acid. Under the conditions of shear and in presence of stearic acid or acid molecules and when compared with the respective examples that did not contain the acid molecules, the drop in the viscosity was the largest for the tin coupled SBR (Example 2). The largest drop in the viscosity is indicative of the breakdown of the tin carbon bonds in Solflex® 3310 Sn.

Examples 5 and 6 were prepared by blending Solflex® 3310 Sn with the ABS resin. Examples 7 and 8 were prepared by blending Solflex® 3310 with the ABS resin. Examples 6 and 8 contained stearic acid. Examples 5 that was prepared with Solflex® 3310 Sn did not show lower viscosity than Example 7 that was prepared with Solflex® 3310. Also, with stearic acid added, the reduction in the viscosity for the Solflex® 3310 Sn SBR (Example 6) for was not as much significant as it was observed in blends of Solflex® 3310 Sn SBR with PPO/PS (Example 2). This demonstrates that the benefits of a lower viscosity are not substantially observed in the ABS resin system when compared with the PPO&PS blend system.

The compositions may be further modified to improve the scratch resistance of the high elastomer compositions by dynamically vulcanizing the elastomer with the help of crosslinking agents. Crosslinking can be accomplished by adding the crosslinking agents in the side-feeding zones after the thermoplastic resin and the SBR have been melt mixed. Crosslinking agents selected from the group of peroxide, phenolic, hydrosilylation, may be utilized for preparing the crosslinked compositions.

The examples are typical and several variations are possible without deviating from the scope of the invention. While certain representative embodiments and details have been shown for the purpose of illustrating the subject invention, it will be apparent to those skilled in this art that various changes and modifications can be made therein without departing from the scope of the subject invention.

What is claimed is:

1. A thermoplastic composition which is comprised of a blend of a thermoplastic resin and an elastomer, wherein said thermoplastic resin is selected from the group consisting of polyphenylene ether and polystyrene wherein said elastomer is tin coupled styrene-butadiene rubber, wherein said tin coupled styrene-butadiene rubber is highly branched, wherein said tin coupled styrene-butadiene rubber is characterized by having a G' and G" frequency crossover of no more than 4 radians/s at 100° C., wherein the thermoplastic resin is present in an amount which is within the range of 20 parts by weight to 80 parts by weight, and wherein the elastomer is present in an amount which is within the range of 20 parts by weight to 80 parts by weight, based upon the total weight of the thermoplastic composition.

2. A thermoplastic composition as specified in claim 1 wherein the elastomer is at least partially crosslinked in the thermoplastic composition.

3. A thermoplastic composition as specified in claim 2 wherein the thermoplastic composition consists essentially of the thermoplastic resin and the elastomer, and wherein the elastomer consists essentially of the tin coupled styrene-butadiene rubber.

4. A thermoplastic composition as specified in claim 3 wherein the vinyl aromatic monomer is present in the elastomer at a level which is within the range of about 5 weight percent to about 50 weight percent.

5. A thermoplastic composition as specified in claim 3 wherein the thermoplastic resin is polyphenylene ether.

6. A thermoplastic composition as specified in claim 2 wherein the said blend has a melt flow rate of at least 0.5 g/10 minutes per ASTM D 1238 at 260° C./2.16 kg load.

7. A thermoplastic composition as specified in claim 2 wherein said thermoplastic composition is further comprised of a viscosity reducing agent.

8. A thermoplastic composition as specified in claim 2 wherein said thermoplastic composition is further comprised of an acid selected from the group consisting of stearic acid, benzoic acid and rosin acid.

9. A thermoplastic composition as specified in claim 1 wherein the thermoplastic resin is present in an amount which is within the range of 40 parts by weight to 60 parts by weight, and wherein the elastomer is present in an amount which is within the range of 40 parts by weight to 60 parts by weight based upon the total weight of the thermoplastic composition.

10. A thermoplastic composition as specified in claim 9 wherein the thermoplastic composition consists essentially of the thermoplastic resin and the elastomer, and wherein the elastomer consists essentially of the tin coupled styrene-butadiene rubber.

11. A thermoplastic composition as specified in claim 1 wherein the thermoplastic resin used has a melt flow rate of at least greater than 0.5 g/10 minutes as measured by ASTM D 1238 at 260° C./2.16 kg load.

12. A thermoplastic composition as specified in claim 1 wherein the elastomer has a Mooney ML 1+4 viscosity at 100° C. which is within the range of about 10 to about 135.

13. A thermoplastic composition as specified in claim 1 wherein the elastomer used has a Mooney ML 1+4 viscosity at 100° C. which is within the range of about 30 to about 80.

14. A thermoplastic composition as specified in claim 1 wherein the glass transition temperature of the thermoplastic resin is at least 75° C. as measured by differential scanning calorimeter at a heating rate of 10° C./minute.

15. A thermoplastic composition as specified in claim 1 wherein the particle size of a major portion of the elastomer in the blend is smaller than 50 microns.

16. A thermoplastic composition as specified in claim 1 wherein the particle size of a major portion of the elastomer in the blend is smaller than 10 microns.

17. A thermoplastic composition as specified in claim 1 wherein the elastomer has a 1,2-vinyl butadiene microstructure content which is within the range of about 5 to about 90% by weight.

18. A thermoplastic composition as specified in claim 1 wherein the elastomer has a 1,2-vinyl butadiene microstructure content which is within the range of about 20 to about 60% by weight.

19. A thermoplastic composition as specified in claim 1 wherein the elastomer has a glass transition temperature in the range of −80° C. to about 10° C. as measured by differential scanning calorimeter at a heating rate of 10° C./minute.

20. A thermoplastic composition as specified in claim 1 wherein said thermoplastic composition is further comprised of a member selected from the group consisting of processing oil, processing aids, and plasticizers in an amount which is within the range of about 5 parts by weight to about 50 parts by weight, based upon the weight of the elastomer in the thermoplastic composition.

21. A thermoplastic composition as specified in claim 1 wherein an antidegradant is present in the elastomer.

22. A thermoplastic composition as specified in claim 21 wherein the antidegradant is an antioxidant or an antiozonant selected at least from the group of styrenated phenols, butylated octylated phenol, butylated di(dimethylbenzyl) phenol, p-phenylenediamines, butylated reaction products of p-cresol and dicyclopentadiene, polyphenolic anitioxidants, hydroquinone derivatives, quinoline, phosphites, diphenylene antioxidant, and thioesters.

23. A thermoplastic composition as specified in claim 1 wherein said thermoplastic composition is further comprised of an ultra-violet light protector selected from the group consisting of carbon black, hindered amine light stabilizers, benzotriazoles, and benzophenones.

24. A thermoplastic composition as specified in claim 1 wherein said thermoplastic composition is further comprised of a reinforcing filler selected from the group consisting of silica, carbon black, kaolin clay, talc, calcium carbonate, glass fibers, alumina, wollastonite, graphite and expandable 2:1 layered silicates.

25. A thermoplastic composition as specified in claim 1 wherein the thermoplastic resin is polystyrene.

26. A thermoplastic composition as specified in claim 1 wherein the polystyrene is syndiotactic polystyrene.

27. A process for preparing a thermoplastic composition which comprises (1) mixing a thermoplastic resin and an elastomer at a temperature about or above the softening point of the thermoplastic resin in a mixing device, (2) discharging the mixed blend from the mixing device, and (3) forming the mixed blend into a pellet, sheet, or article of manufacture, wherein said thermoplastic resin is selected from the group consisting of polyphenylene ether and polystyrene wherein said elastomer is tin coupled styrene-butadiene rubber, wherein said tin coupled styrene-butadiene rubber is highly branched, wherein said tin coupled styrene-butadiene rubber is characterized by having a G' and G" frequency crossover of no more than 4 radians/s at 100° C., wherein the thermoplastic resin is present in an amount which is within the range of 20 parts by weight to 80 parts by weight, and wherein the elastomer is present in an amount which is within the range of 20 parts by weight to 80 parts by weight, based upon the total weight of the thermoplastic composition.

28. A process as specified in claim 27 wherein the mixer is a batch mixer.

29. A process as specified in claim 27 wherein the mixer is a continuous mixer.

30. A process as specified in claim 27 wherein the thermoplastic composition further comprises a member selected from the group consisting of a crosslinking agent, an accelerator, a cure activator that is selected at least from the group consisting of peroxides, sulfur, sulfur donors, zinc oxide, stearic acid, a phenolic resin, amines, disulfides, guanidines, thioureas, thiazoles, thiurams, sulfenamides, dithiocarbamates xanthates, hydrosilylation agent with at least 2 Si-H groups per molecule and a hydrosilylation catalyst.

31. A process as specified in claim 27 wherein the thermoplastic composition is formed into an article of manufacture selected from the group consisting of automotive interior panels, automotive exterior body panels, automotive instrument panels, soft-touch parts, household appliances, household goods, toys, razor holders, razor handles, stapler handles, pen grips, and computer key boards.

32. A process as specified in claim 27 wherein the thermoplastic resin and the elastomer are mixed by the application of shear.

33. A process as specified in claim 32 wherein the elastomer and the thermoplastic resin are intimately mixed.

34. A process as specified in claim 27 wherein the elastomer is crosslinked as it is mixed with the thermoplastic resin.

35. A thermoplastic composition which is comprised of a blend of a thermoplastic resin and an elastomer, wherein said thermoplastic resin is selected from the group consisting of polyphenylene ether and polystyrene wherein said elastomer is comprised of a conjugated diene selected from 1,3-butadiene and isoprene, wherein the elastomer is coupled with tin, wherein said elastomer is highly branched, wherein the elastomer is characterized by having a G' and G" frequency crossover of no more than 4 radians/s at 100° C., wherein the thermoplastic resin is present in an amount which is within the range of 20 parts by weight to 80 parts by weight, and wherein the elastomer is present in an amount which is within the range of 20 parts by weight to 80 parts by weight, based upon the total weight of the thermoplastic composition.

36. A thermoplastic composition as specified in claim 35 wherein the elastomer is crosslinked as it is mixed with the thermoplastic resin.

37. A process for preparing a thermoplastic composition which comprises (1) mixing a thermoplastic resin and an elastomer at a temperature about or above the softening point of the thermoplastic resin in a mixing device, (2) discharging the mixed blend from the mixing device, and (3) forming the mixed blend into a pellet, sheet, or article of manufacture, wherein said thermoplastic resin is selected from the group consisting of polyphenylene ether and polystyrene wherein said elastomer is comprised of a conjugated diene selected from 1,3-butadiene and isoprene, wherein the elastomer is coupled with tin, wherein said elastomer is highly branched, wherein the elastomer is characterized by having a G' and G" frequency crossover of no more than 4 radians/s at 100° C., wherein the thermoplastic resin is present in an amount which is within the range of 20 parts by weight to 80 parts by weight, and wherein the elastomer is present in an amount which is within the range of 20 parts by weight 80 parts by weight, based upon the total weight of the thermoplastic composition.

* * * * *